Oct. 28, 1969 J. M. POLDER 3,474,981

RECORD MEDIUM TRANSPORT AND REWIND SYSTEM
FOR A RECORDING INSTRUMENT

Original Filed June 22, 1964

INVENTOR.
JOHN M. POLDER

BY

Eber J. Hyde

ATTORNEY

United States Patent Office 3,474,981
Patented Oct. 28, 1969

3,474,981

RECORD MEDIUM TRANSPORT AND REWIND SYSTEM FOR A RECORDING INSTRUMENT

John M. Polder, Parma, Ohio, assignor to Clevite Corporation, a corporation of Ohio Original application June 22, 1964, Ser. No. 376,683, now Patent No. 3,306,548, dated Feb. 28, 1967. Divided and this application Nov. 23, 1966, Ser. No. 596,687
The portion of the term of the patent subsequent to Feb. 28, 1984, has been disclaimed
Int. Cl. B65h *17/02, 23/06*
U.S. Cl. 242—67.3 1 Claim

ABSTRACT OF THE DISCLOSURE

A record medium transport and rewind system for a recording instrument including a stationary guide bar having a straight central section and two end sections which are at an angle with the central section.

Figure 1:
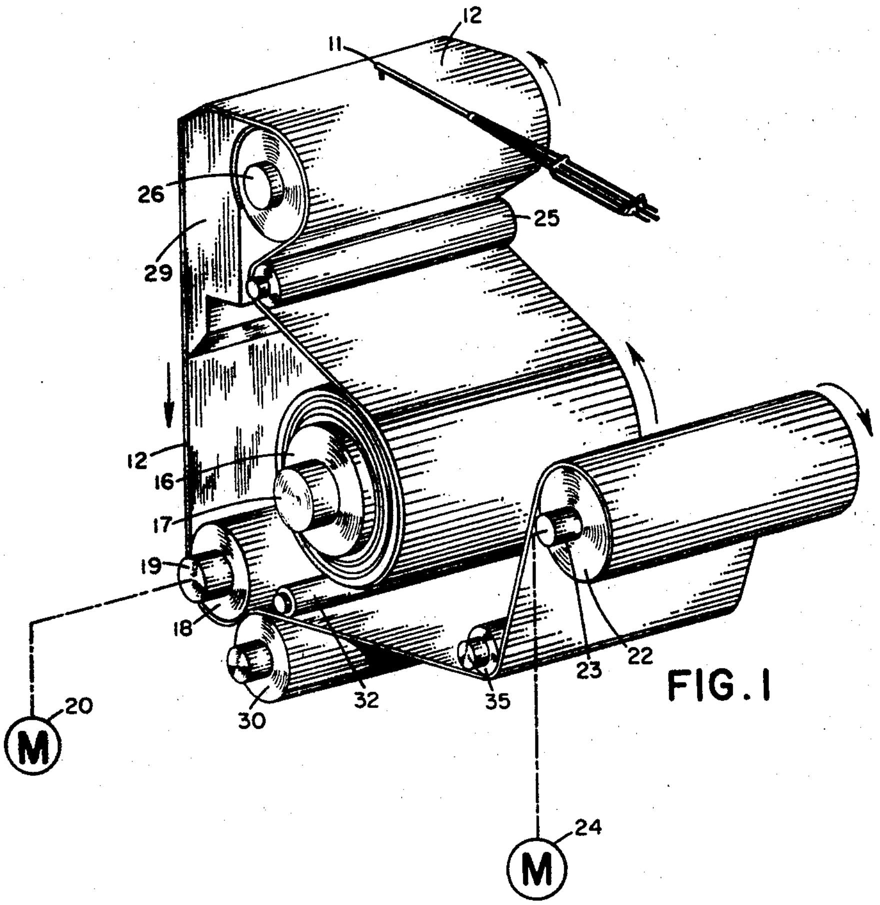

This invention pertains to a record medium transport and rewind system for a recording instrument, and more particularly to a system for rewinding the record medium in a neat, compact roll.

This is a division of patent application Ser. No. 376,683, filed June 22, 1964, for Record Medium Transport and Rewind System for a Recording Instrument, which issued as Patent No. 3,306,548, on Feb. 28, 1967.

Patent No. 3,306,548 claims a roller device for tensing the record member and the present invention sets forth a stationary bar for tensioning the record member.

In many recording instruments the record medium is rewound onto a roll after a recording has been made. In many of the recording and rewind systems a drive roller pulls the record medium at a carefully controlled rate past the recording device, and a separately powered rewind roll "take up" the record medium after it passes the recording device. It is important that the power to the take-up roll be limited to an amount such that the torque will never cause the tension on the record medium being rewound to overpower the record medium drive system. To do so would destroy the highly desired constant speed of the record medium as it passes the recording device. In the normal rewind device the tension on the record medium being rewound is greatest at the beginning of the rewind operation when the diameter of the take-up core is smallest. As the diameter of the rewind core increases the tension on the record medium decreases. The rewind tension must be set so that at the beginning of the rewind operation the rewind or take-up roll does not control the movement of the record medium past the recording device, and this tension decreases as the rewind roll fills up. Experience has shown that near the end of the rewind operation there is insufficient tension on the record medium to assure that it rolls up neatly on the take-up roll, and consequently it begins to wander from side to side, and the result is a loose spongy mass jammed between two side plates. Also, sometimes the lateral wander of the record medium at the rewind roll is sufficient to reflect back past the drive roll to the recording location with consequent serious errors in the record being made. Exact parallelism of the shafts of the rewind roll and of the drive roll help to control the sidewise wander, but it is expensive to provide such absolute parallelism and it is merely an aid, it is not an absolute cure to the rewind problem.

An object of the present invention is to provide a record medium transport and rewind system wherein neat, even spooling of the rewound medium is achieved in a reliable, inexpensive manner.

Another object of the present invention is to control in an instrument the side to side wander of the record medium which is being rewound.

For a better understanding of the present invention, together with other and further objects thereof, reference is had to the following description taken in connection with the accompanying drawings, and its scope will be pointed out in the appended claims.

FIGURE 1 of the drawing is an isometric, somewhat schematic, view of a record medium transport and rewind system.

Figure 2:
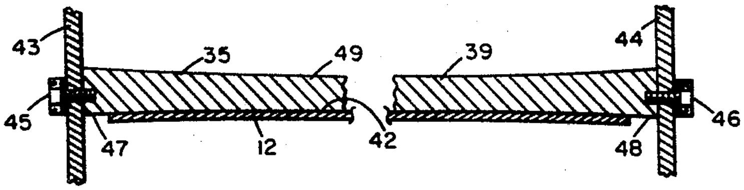

FIGURE 2 is a side view of a stationary bar used to control the rewind of a record medium.

With reference to the drawing there is shown in FIGURE 1 a typical record medium transport system for use with a pen recorder device. The pen recorder device includes an inking pen 11 in contact with a record medium 12 which is adapted to be driven past the pen tip 11. It is to be understood that the pen is oscillated through a linkage system by a shaft which is rotated in accordance with the signal to be recorded, the details of which do not form part of this invention.

The record medium 12 is stored on a supply roll 16 which is rotatably mounted by journals 17 in side plates, not shown. A drive roll 18 is mounted by journals 19 in the side plates and is driven by motor means 20. A rotatable take-up roll 22 is mounted in the side plates by journals 23 and is driven by motor means 24.

The record medium 12 is withdrawn from the supply roll 16 under the control of the drive roll 18, and it extends under the guide roll 25, around a tension roll 26 which is mounted in the side plates and applies a controlled amount of tension to the record medium by means not shown, and over a flat writing bar 29 to the drive roll 18. A pressure roller 30 couples the record medium 12 to the drive roller 18 and isolates the record medium at the location of the writing bar from the take-up roll 22. A guide rod or roll 32 engages the record medium 12 as it leaves the pressure roller 30. The record medium then engages record medium guide means 35 which forms the subject matter of the present invention. From the guide means 35 the record medium extends to the motor driven take-up or rewind roll 22 where it is to be tightly and neatly rewound. Motor means 24 through the take-up roll 22 exerts a given amount of tension on the record medium sufficient to neatly rewind it, but insufficient to reflect back on the record medium ahead of the drive roll 18 so that drive roll 18 has absolute control of the speed of the record medium at the writing bar 29.

In order to control the lateral wander of the record medium as it approaches the take-up roll 22, the guide means 35 has spaced apart end sections 47, 48 which tension both edges of the record medium to an extent slightly greater than its central section 42 tensions the central portion of the record medium. It has been found that this slightly increased tension at the edges of the record medium as it is pulled over the guide means 35 accurately guides the record medium to the take-up roll 22 and substantially eliminates the sideways wander of the record medium. The guide means as shown in FIGURE 2 may be a fixed bar 39 which is non-rotatably bolted between side plates 43, 44 by means of bolts 45, 46 and which has its end portions 47, 48 tapered at a slight angle to the central portion 42 in order to tension the edges of the record medium 12 to an extent slightly greater than the central portion of the record medium.

The angle which the end portions 47, 48 make with the central portion 49 of the bar 39 should be at least 179° and preferably at least 179° 30′ so that the edges of the record medium are tensioned only slightly greater than the central portion of the record medium, and, as shown in FIGURE 2 the record medium in its normal position in engagement with the guide means 35 should engage equal length portions of the flared ends thereof so that the opposite edge portions of the record medium are equally tensioned. The angle should be not greater than about 179° 50'. The record medium will then stay in the central position where its edges are equally tensioned, and any tendency of the record medium to move to one side will tend to increase the edge tension on the side toward which it moves, and will prevent any substantial sideways movement of the record medium.

In FIGURE 2 the end sections are shown with straight tapers. It is to be understood, however, that it is not essential for the taper to be straight. It may be gently curved, and if curved it is preferable that the end sections be concave.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A record medium transport and rewind system for a recording instrument, comprising, in combination, a supply roll for supplying a length of record medium, take-up roll means for rewinding said record medium, recording means for recording on said record medium and located between said supply roll and said take-up roll means, drive roll means in driving engagement with said record medium at a location between said recording means and said take-up roll means for pulling said record medium from said supply roll past said recording means, take-up roll driving means driving said take-up roll to rewind said record medium after it has moved past said drive roll means, and record medium guide means located between the drive roll means and the take-up roll means around which the record medium is stretched, said record medium guide means comprising a stationary bar having a straight central section and having two end sections spaced apart by said central section and which make an angle with said straight central section between about 179° 50' and 179°, said central section having a given length transverse to the direction of motion of said record medium, and each of said two end sections having a given length transverse to the direction of motion of said record medium which is small compared to said first mentioned given length, said record medium engaging said central section and said two end sections, whereby said record medium guide means tensions both edges of said record medium to an extent greater than it tensions the central portion thereof to accurately guide said record medium to said take-up roll and to substantially eliminate side wander thereof.

References Cited

UNITED STATES PATENTS

| | | | |
|---|---|---|---|
| 674,919 | 5/1901 | Jefferis | 242—56.4 |
| 2,033,543 | 3/1936 | Twiss et al. | 242—67.2 |
| 2,486,121 | 10/1949 | Corn | 242—76 X |
| 2,592,090 | 4/1952 | Weaver | 242—76 |
| 2,769,324 | 11/1956 | Noe | 26—63 X |
| 3,106,767 | 10/1963 | Fox | 26—63 X |
| 3,306,548 | 2/1967 | Polder | 242—67.3 |

STANLEY N. GILREATH, Primary Examiner

U.S. Cl. X.R.

242—76